United States Patent [19]

Wilburn et al.

[11] Patent Number: 4,633,417

[45] Date of Patent: Dec. 30, 1986

[54] EMULATOR FOR NON-FIXED INSTRUCTION SET VLSI DEVICES

[75] Inventors: Darrell L. Wilburn, Saratoga; John R. Mick, Los Altos Hills, both of Calif.

[73] Assignee: Step Engineering, Sunnyvale, Calif.

[21] Appl. No.: 622,691

[22] Filed: Jun. 20, 1984

[51] Int. Cl.⁴ .................. G06G 7/48; G01R 15/12
[52] U.S. Cl. ................. 364/550; 324/73 R; 364/578; 364/481
[58] Field of Search ........ 364/578, 200, 900, 481–484, 364/550, 551; 324/73 R; 371/23, 25, 20

[56] References Cited

U.S. PATENT DOCUMENTS

| 3,961,250 | 6/1976 | Snethen | 371/23 X |
|---|---|---|---|
| 4,084,235 | 4/1978 | Hirtle et al. | 364/200 |
| 4,216,539 | 8/1980 | Raymond et al. | 324/73 R X |
| 4,277,827 | 7/1981 | Carlson et al. | 364/200 |
| 4,370,709 | 1/1983 | Fosdick | 364/578 X |
| 4,527,234 | 7/1985 | Bellay | 324/73 R X |
| 4,527,249 | 7/1985 | VanBrunt | 364/481 X |

OTHER PUBLICATIONS

"Bit-Slice/Bipolar Development Tool Cuts Micropro-gramming Costs", *Computer Design*, Mar. 1981, pp. 60 and 62.

*Primary Examiner*—Errol A. Krass
*Assistant Examiner*—Joseph L. Dixon
*Attorney, Agent, or Firm*—Thomas E. Schatzel

[57] ABSTRACT

An emulator for non-fixed instruction set VLSI devices having a microprogrammable emulator controller which can be used with a variety of VLSI devices and provide in-circuit emulation for general VLSI technology with capabilities comparable to the in-channel emulation capabilities previously available for fixed instruction set MOS microprocessors. This includes a device specific emulator head which is controlled by the emulator controller to emulate a VLSI device in a target machine. The VLSI device to be emulated is removed from the target machine and a device plug of the emulator head is inserted into the target machine. The VLSI device is placed in a socket in the emulator head. The emulator controller monitors instructions sent from the target machine to the VLSI device and provides instructions to the VLSI device.

16 Claims, 5 Drawing Figures

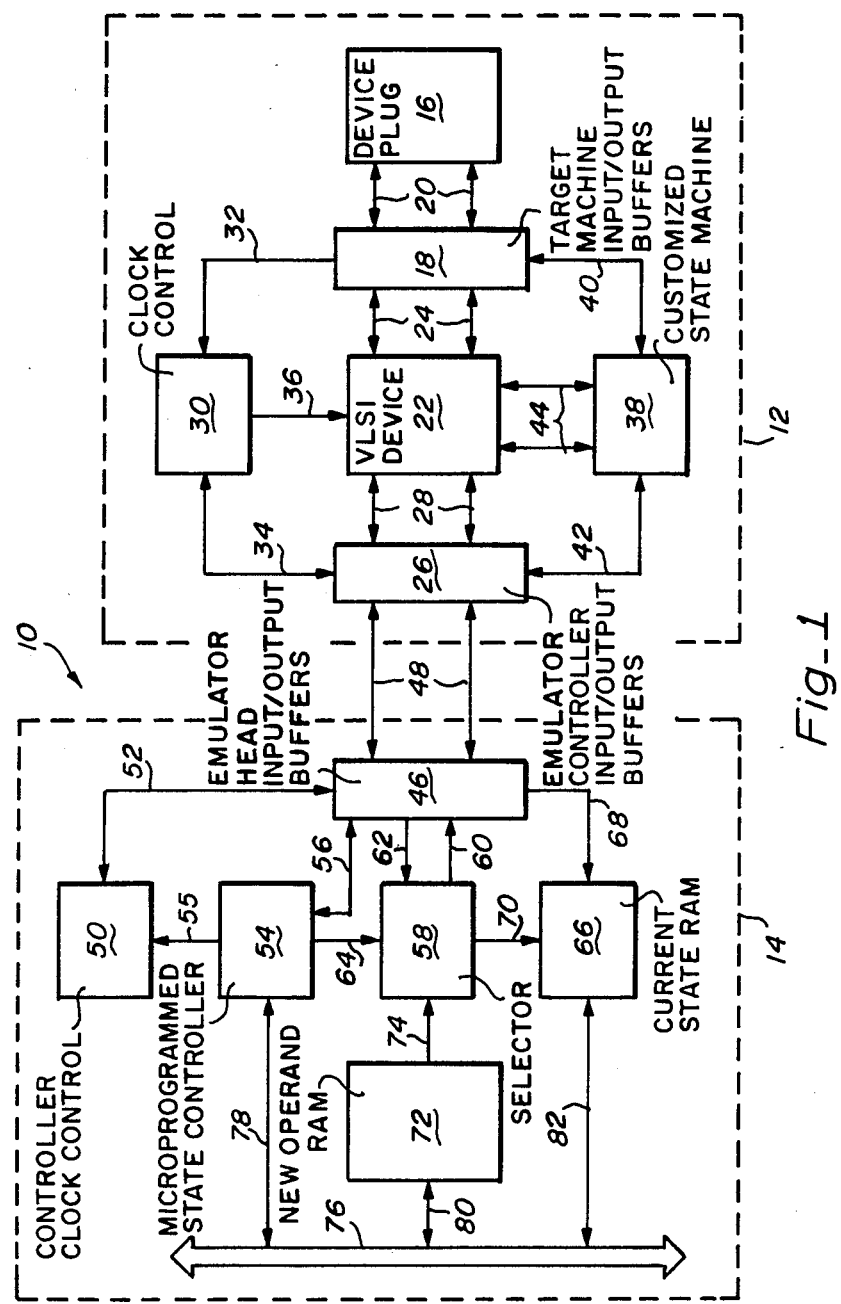
Fig_1

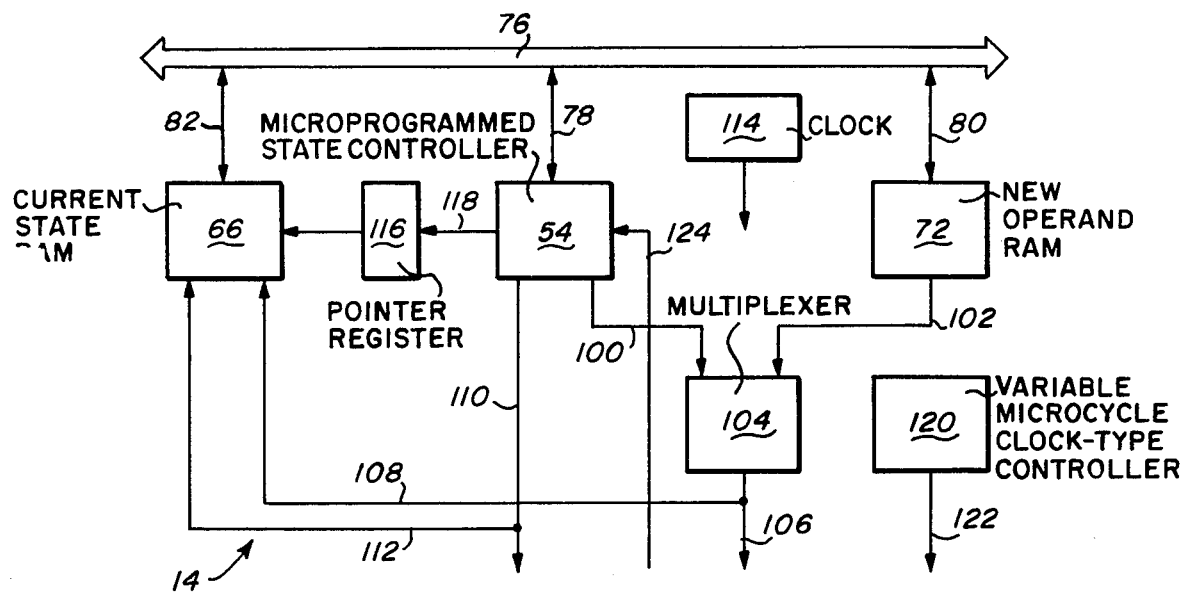
Fig_2
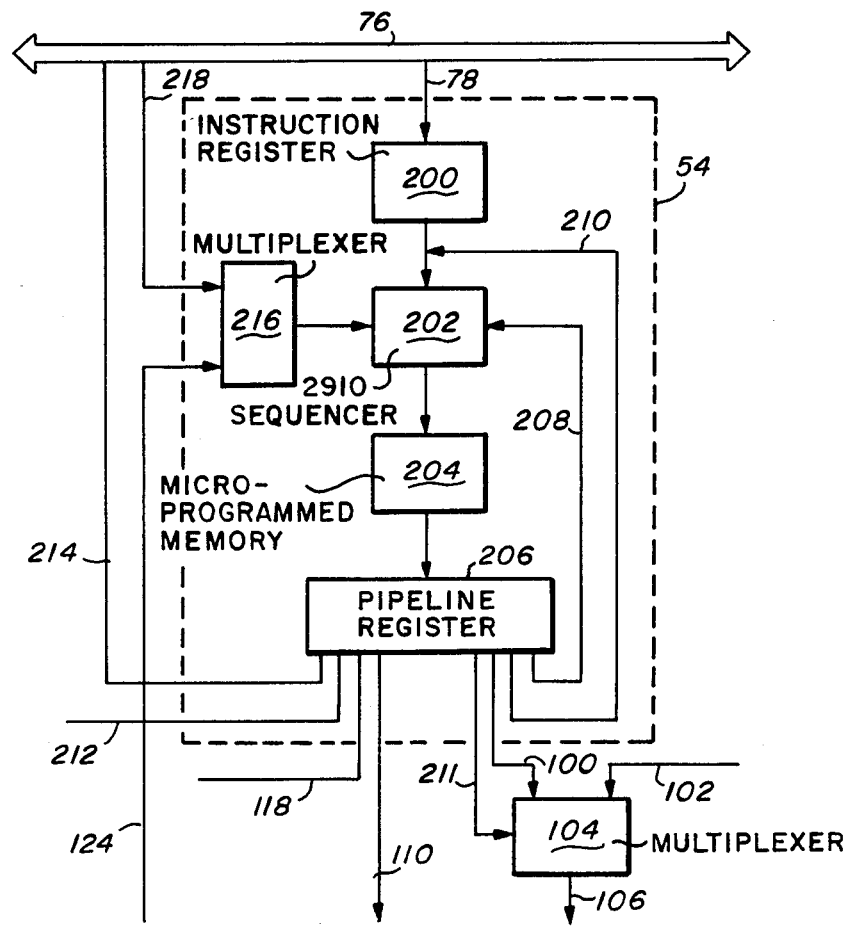
Fig_3

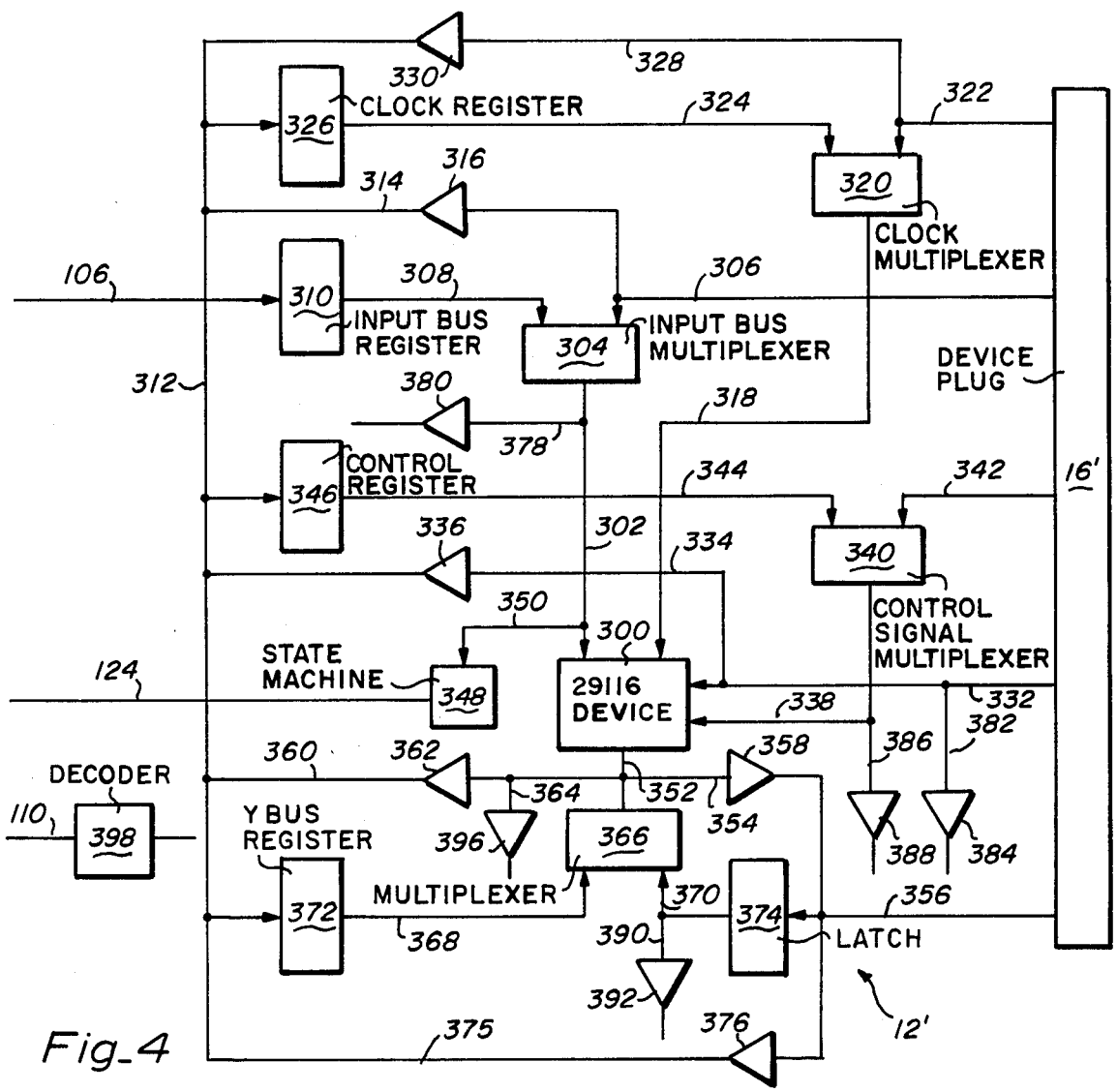
Fig_4
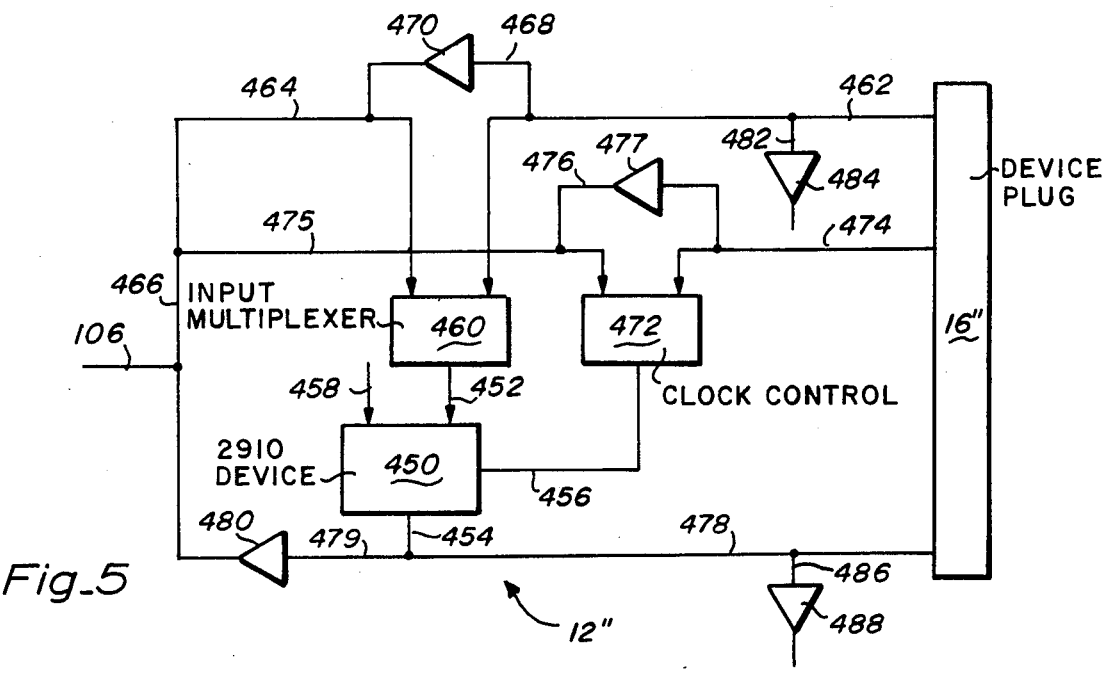
Fig_5

EMULATOR FOR NON-FIXED INSTRUCTION SET VLSI DEVICES

BACKGROUND OF THE INVENTION

Field ot the Invention

The invention relates generally to in circuit emulators and more particularly to emulators for in circuit emulation of non-fixed instruction set VLSI devices Description of the Prior Art In the design of a computer system, development systems are used which allow the designer to develop and test programs and hardware systems. Typically, development systems include an in circuit emulator as a computer system design tool. In circuit emulation refers to the ability to replace a device in a system under test with a plug-in connector which is connected to an emulator which makes the plug-in connector appear to the system under test as nearly like the device which was removed as possible. In this way, the emulator or the target machine (the computer system under test) can have control of the device. When the emulator takes control of the device, it can interrogate to determine the state of the device, including reading the values of internal registers and stacks.

Currently, there are emulators in existence for most MOS microprocessors. All of these MOS microprocessors are fixed instruction set machines. This means that the microprocessor has an instruction set built into it. However, there is no emulator support for non-fixed instruction set devices. The term "non-fixed instruction set devices" as it is used herein refers to VLSI devices which are used in machines (computers) where the designer selects the instruction set as opposed to the typical MOS microprocessor where the instruction set is already chosen. Examples of such devices include the 29116 and 2910 devices manufactured by Advanced Micro Devices. While it is understood that 29116, 2910 and other similar devices do have a fixed set of operations they will perform, the terminology regarding a "non-fixed instruction set" used herein was selected to differentiate devices such as the 29116 and 2910 from MOS microprocessors. Included within the various categories of non-fixed instruction set devices are those referred to as bit slice microprogrammable parts. In general, the prior art has not been able to emulate microprogrammed VLSI devices for use in a development system. VLSI refers to Very Large Scale Integration. Integrated circuits utilizing VLSI technology are generally characterized by putting an entire function on a large integrated circuit, packaging it and utilizing that function as a subsystem in an overall circuit. VLSI implementation may be in the form of a complete microprocessor, but may also be in the form of gate-arrays, custom circuits or semi-custom circuits. It has only been within the last few years that the semiconductor industry has had the capability to implement VLSI. As VLSI development continues, the need for emulator support for non-fixed instruction set VLSI devices will increase.

It is desirable to record events occurring within the device, such recording capability is called the "trace". It is therefore desireable to provide a means for connecting the various input/outputs and control signals of the device to a trace.

Currently, emulator controllers are capable of controlling only one emulator head. It is desirable to have an emulator controller control more than one emulator head at a time.

SUMMARY OF THE PRESENT INVENTION

It is therefore an object of the present invention to provide an emulator for any non-fixed instruction set VLSI device.

It is a further object to provide an emulator with customized clock control.

It is a further object to provide an emulator with customized state machine control.

It is a further object to provide an emulator with a generalized emulator controller which can be programmed by the user.

It is a further object to provide an emulator with a device connection means in order to provide a trace capability.

It is a further object to provide an emulator which can examine the state of all logic devices internal to the VLSI device without modification of such state and report such state to a user.

It is a further object to provide an emulator which can modify the state of logic devices internal to the VLSI device.

It is a further object to provide an emulator with an emulator controller which can control more than one emulator head at time.

Briefly, a preferred embodiment of the present invention includes an emulator head having a device plug which may be inserted into a target machine, a plurality of target machine input/output buffers connected to the device plug by a plurality of signal paths, a VLSI device connected to the target machine input/output buffers by a plurality of signal paths, a means for controlling clock signals which is connected to the target machine input/output buffers by a signal path and to the VLSI device by a signal path, a plurality of emulator controller input/output buffers which are connected to the clock signal control means by a signal path and to the VLSI device by a plurality of signal paths, and a means for determining the nature of instructions sent to the VLSI device by the target machine which means is connected to the target machine input/output buffers by a signal path, to the VLSI device by a plurality of signal paths and to the emulator input/output buffers by a signal path.

The emulator further includes an emulator controller having a plurality of emulator head input/output buffers which are connected to the emulator controller input/output buffers by a plurality of signal paths, a second means for controlling clock signals which is connected to the emulator head input/output buffers by a signal path, a means, e.g. microprogrammable for controlling the transmission of instructions and control signals to the VLSI device and the reception of data from the VLSI device and the target machine, such means being connected to the emulator head input/output buffers by a signal path and to the clock signal control means by a signal path, a means for storing data corresponding to the current state of logic devices internal to the VLSI device, such means being connected to the emulator head input/output buffers by a signal path, a means for storing new operands, a means for selecting the source of signals to be transmitted to the VLSI device, which means is connected to the current state data storage means by a signal path, to the microprogrammable control means by a signal path, to the new operands storage means, by a signal path and to the emulator head input/output buffers by a plurality of signal paths, and a host computer bus which is connected to the current state data storage means by a signal path, to the new operands storage means by a signal path and to the microprogrammable control means by a signal path.

The VLSI device to be emulated is removed from the target machine and the device plug is inserted into the target machine in place of the VLSI device. The VLSI device is placed within a socket in the emulator head. The VLSI device may be controlled by either the emulator controller or by the target machine. Signals from the target machine are transmitted to the VLSI device through the target machine input/output buffers. The values in logic devices internal to the VLSI device may be read into the emulator controller through the emulator controller input/output buffers. Also, control signals and clock signals to the VLSI device and output signals from the VLSI device may likewise be read into the emulator controller. Clock signals may be controlled by the emulator controller or the target machine.

The type of instructions being transmitted from the target device to the VLSI device is monitored and the nature of such instructions is transmitted to the emulator controller.

The emulator controller provides instructions to the VLSI device. Data read from the VLSI device is stored in the emulator controller where it can be retrieved by the user through the host processor. Similarly, new values to be written in the VLSI device are stored in the emulator controller until they are transmitted to the emulator head. The emulator controller may be incorporated in various forms between the host processor and the emulator head, particularly as host computers become more powerful and available the controller may be partitioned between hardwired logic host memory programs or microprogrammed implementations. However, the basic mechanism of the controller is still utilized.

IN THE DRAWING

FIG. 1 is a block diagram of a VLSI device emulator in accordance with the present invention;

FIG. 2 is a block diagram of an emulator controller;

FIG. 3 is a block diagram of the microprogram state machine used in the emulator controller of FIG. 2;

FIG. 4 is a block diagram of an emulator head for a 29116 VLSI device; and

FIG. 5 is a block diagram of an emulator head for a 2910 VLSI device.

DETAILED DESCRIPTION OF THE PREFERRED EMBODIMENT

In FIG. 1, there is illustrated a non-fixed instruction set VLSI device emulator referred to by the general reference numeral 10 and incorporating the present invention. The emulator 10 includes an emulator head 12 and an emulator controller 14. The emulator head 12 includes a device plug 16 connected to a plurality of target machine input/output buffers 18, by a plurality of device plug signal paths 20.

The device plug 16 typically has a plurality of pins which correspond to the pin arrangement of the VLSI device to be emulated so that it can replace such VLSI device within a target machine.

The signal paths 20 may be in the form of a multilead cable of minimum length to maximize the speed at which emulator 10 can operate. The input/output buffers 18 are connected to a VLSI device 22 by a plurality of target machine input/output signal paths 24. The VLSI device 22 is a non-fixed instruction set device. The VLSI device 22 may be a microprocessor or a separate function that may be used as a subsystem in an overall system. The VLSI device 22 may be gate-arrays or custom circuits also. In particular, the 29116 and 2910 devices manufactured by Advanced Micro Devices may be emulated using the present invention.

VLSI device 22 is connected to a plurality of emulator controller input/output buffers 26 by a plurality of emulator controller input/output signal paths 28. A clock control 30 is connected to input/output buffers 18 by a target machine clock signal path 32. Clock control 30 is also connected to input/output buffers 26 by an emulator controller clock signal path 34. VLSI device 22 is connected to clock control 30 by a clock control output signal 36.

A customized state machine 38 is connected to input/output buffers 18 by target/state machine's signal path 40. State machine 38 is also connected to input/output buffers 26 by an emulator controller/state machine signal path 42. VLSI device 22 is connected to state machine 38 by a plurality of state machine/VLSI device signal paths 44.

The emulator controller 14 has a plurality of emulator head input/output buffers 46 which are connected to emulator controller input/output buffers 26 by a plurality of control-head signal paths 48. Signal paths 48 may be in the form of a multi-lead cable of a length which permits emulator head 12 to be remotely located from emulator controller 14. A controller clock control 50 is connected to input/output buffers 46 by a controller clock signal path 52.

A microprogrammed state controller 54 is connected to controller clock control 50 by a signal path 55 and to the emulator head input/output buffers 46 by a path 56.

A selector 58 is connected to input/output buffers 46 by a selector output signal path 60 and a selector input signal path 62. Selector 58 is also connected to microprogrammed state controller 54 by a state controller output signal path 64. A current state random access memory (RAM) 66 is connected to input/output buffers 46 by a current state RAM input signal path 68. Selector 58 is additionally connected to current state RAM 66 by pointer signal path 70.

A new operand RAM 72 is connected to selector 58 by operand RAM output signal path 74. A host processor bus 76 is connected to microprogrammed state controller 54, new operand RAM 72 and current state RAM 66 by a first, a second, and a third bus connection signal path 78, 80, and 82, respectively. An Intel Multibus and a Motorola 68000 microprocessor or their equivalents may be used as the host processor bus with the emulator 10 of the present invention.

A more detailed diagram of the emulator controller 14 is shown in FIG. 2. A state controller data output line 100 and an operand RAM data output line 102 are multiplexed by a multiplexer 104 which is controlled by microprogrammed state controller 54. The output of multiplexer 104 is a data bus 106 which is connected through input/output buffers 46 and 26 to a similar bus in emulator head 12. Coming off data bus 106 is a first current state RAM data input line 108. Typically, data input line 108 carries 16 bits in parallel. Microprogrammed state controller 54 is connected to a combination address/data bus 110 which communicates with a similar bus in emulator head 12. A second current state RAM data input line 112 of similar composition as data input line 108 comes off address/data bus 110. The emulator controller 14 has a clock 114 which provides the appropriate clock signals for the operation of the emulator controller 14. A pointer register 116 is associated with current state RAM 66 and is controlled by microprogrammed state controller 54 over pointer control line 118. A variable microcycle clock-type controller 120 controls write, read, no-operation, and write-/read functions in emulator head 12 over clock control line 122 which is in communication with the emulator head 12. A test input line 124 may be used as an input to state controller 54 to provide a signal from emulator head 12 as to whether or not instructions from controller 54 are capable of being executed by VLSI device 22 at a given time.

FIG. 3 illustrates the structure of microprogrammed state controller 54. Microprogrammed state controller 54 includes an instruction register 200, the output of which is provided to a 2910 sequencer 202. The sequencer 202 provides the address in a microprogrammed memory 204 of the next micro-instruction to be executed. The microprogrammed memory 204 provides the next instruction to be executed to a pipeline register 206. The output of pipeline register 206 includes a next address control line 208, a jump address control line 210, state controller data output line 100, a multiplexer control line 211, combination address/data bus 110, pointer control line 118, a clock control line 212 and a completion of instruction line 214. Microprogram state controller 54 also includes a multiplexer 216, the input of which are test signal line 124 and a start instruction execution line 218.

The emulator controller 14 is a generalized controller in that it is not limited to a specific VLSI device. When the type of VLSI device is changed, no hardware changes are necessary in emulator controller 14. In order to adapt the emulator controller 14 for a new VLSI device, only the contents of microprogram memory 204 need to be altered to accomodate the new VLSI device. Also due to the generalized nature of the emulator controller 14, it is possible to run more than one emulator head 12. Since the data/address structure between controller 14 and head 12 is not device specific, a plurality of heads may be controlled by a single controller 14. Even heads for different VLSI devices may be controlled by a single controller. This is accomplished by using an appropriate program in the microprogram memory 204.

The host processor bus 76 can communicate with current state RAM 66, microprogrammed state controller 54 and the new operand RAM 72 in response to the users needs. For example, if it was desired to modify the state of a register in the emulator head 12, a command would go to the microprogrammed state controller 54 where it is directed to the appropriate instruction in the microprogram memory 204. A new value to be loaded in the register is placed in the new operand RAM 72. Then the microprogram state controller 54 will send the contents of the new operand RAM 72 to the appropriate register in the emulator head. Similarly, when it is desired to read the contents of a register or other memory, the microprogram state controller 54 sends an appropriate instruction to the emulator head 12 and the data requested is placed in the current state RAM 66.

FIG. 4 illustrates an emulator head 12' which is designed for an AMD 29116 device. Emulator 12' includes a 29116 device 300 with an input bus 302 which is the output of an input bus multiplexer 304. There are two sources of input to multiplexer 304, a target machine input bus 306 and an emulator controller bus 308. The input buses 302, 306 and 308 are typically comprised of sixteen wires. Target machine input bus 306 is connected to device plug 16'. Emulator controller input bus 308 is the output of an input bus register 310. Input bus register 310 ties into an emulator head data bus 312 which is connected to data bus 106. Data on the target machine input bus 306 may be routed to emulator head data bus 312 over a signal path 314 through a buffer 316.

A clock input path 318 is an input to the 29116 device 300. Clock input path 318 is the output of a clock multiplexer 320 which has two inputs, a target machine clock signal path 322 connected to device plug 16' and an emulator controller clock signal path 324. Emulator controller clock signal path 324 is the output of a clock register 326 which connects to emulator head data bus 312. A clock signal path 328 connects to emulator head data bus 312 through a clock buffer 330.

A first control signal path 332 connects between 29116 device 300 and device plug 16'. A signal path 334 connects first control signal path 332 to emulator head data bus 312 to a control signal buffer 336. A second control signal path 338 is the output of a control signal multiplexer 340 which has two inputs, a target machine control signal path 342 and an emulator controller control signal path 344. Emulator controller control signal path 344 is the output of a control register 346 which connects to the emulator head data bus 312.

A state machine 348 receives an input through a state machine input path 350 and produces a signal which is transmitted to the emulator controller 14 on test input line 124 (see FIGS. 2 and 3).

A bi-directional Y bus 352 is an input/output source to the 29116 device 300. A first Y bus output path 354 connects with a bi-directional target machine Y bus 356 through a buffer 358. A second Y bus output path 360 connects to emulator head data bus 312 through a buffer 362. An input to Y bus 352 is an output 364 of a multiplexer 366 which has two inputs, an emulator controller Y bus 368 and a latch output line 370. Emulator controller Y bus 368 is the output of a Y bus register 372 which connects to emulator head data bus 312. Latch output line 370 is the output of a latch 374 which connects to target machine Y bus 356. Also coming off target machine Y bus 356 is a signal path 375 to emulator head data bus 312 through a buffer 376.

In order to provide connection to a trace capability, various signal paths are provided. These include an input bus trace connection 378 through an input bus trace buffer 380, a first control signal trace connection 382 through a first control signal trace buffer 384, a second control trace connection 386 through a second control signal trace buffer 388, a Y bus input trace connection 390 through a Y bus input trace buffer 392 and a Y bus output trace connection through a Y bus output trace buffer 396.

The combination address/data bus 110 from emulator controller 14 is in communication with emulator head 12' where addresses are decoded by a decoder 398 and appropriately routed and data lines established with the various registers.

The input bus 302 to 29116 device 300 comes through the input bus multiplexer 304. The multiplexer 304 receives input signals produced by the target machine on target machine input bus 306 or inputs produced by the emulator controller 14 over emulator controller input bus 308. Inputs from emulator controller 14 can be temporarily stored in input bus register 310 until instructed to be directed to 29116 device 300 through multiplexer 304. The multiplexer 304 is controlled by the emulator controller 14 and selects either inputs from the emulator controller 14 or the target machine as desired by the user. When it is desired to read the inputs coming directly from the target machine, the signals may be directed through buffer 316 and read onto data bus 106 which is in communication with emulator controller 14.

The Y bus 352 is bi-directional, i.e. it can handle both input and output signals. When the Y bus is used for inputs, those inputs are handled in a manner similar to signals on the input bus 302 as described above. The target machine or the emulator controller 14 may be the source of inputs on the Y bus through a multiplexer 366. If it is desired to read inputs directly from the target machine to the emulator controller 14, a signal path 374 through buffer 376 is provided to allow target machine inputs to be directed to data bus 124. When Y bus 352 is used as an output, data can come out of the 29116 device 300 and proceed to the target machine via first Y bus output path 354 through buffer 358 to target machine Y bus 356. If it is desired to read Y bus 352 outputs back to the emulator controller 14, data is directed on second Y bus output path 360 through buffer 362 to emulator head data bus 312 to data bus 106 which communicates with emulator controller 14.

The 29116 device 300, the design of which is well known in the art, contains an internal Y bus. On that Y bus there is a latch for storing incoming data. In order to properly emulate the 29116 device 300, it is desirable to simulate that internal latch in the form of latch 374 which permits the storage of incoming data on the Y bus to be stored external to the 29116 device 300.

There are two types of control lines associated with the 29116 device 300, inputs and outputs. The control outputs are transmitted to the target machine over first control signal path 332. Such outputs may also be read onto the data bus 106 via signal path 334 through control signal buffer 336 onto emulator head data bus 312. The control inputs are received by the 29116 device 300 on second control signal path 338 which is the output of control signal multiplexer 340. The source of control inputs may either be the target device over target machine control signal path 342 or emulator controller control signal path 334. Control inputs from emulator controller 14 may be temporarily stored in control register 346. Control signal multiplexer 340 is controlled by emulator controller 14 to select the desired source of control input from either the target machine or the emulator controller 14.

The normal source of a clock signal to the 29116 device 300 is from the target machine. However, emulator head 12' is designed such that the clock control signal from the target machine may be multiplexed in clock multiplexer 320 along with a clock control signal from the emulator controller 14 on emulator controller clock signal path 324. The emulator controller 14 can provide, through clock register 326, a signal into the 29116 device 300 to perform the clocking function. The emulator head 12' also has the capability to read the clock signal polarity to emulator controller 14 via clock signal path 328 through clock buffer 330 onto emulator head data bus 312 and to data bus 106. This allows the user to determine if the clock has stopped low or stopped high and take control of the same polarity. For example, if the clock had stopped low, the emulator controller can cause a low-high-low transition to cause a "clock" to occur. Conversely, if the clock is stopped high, a high-low-high transition is used to cause a "clock" to occur.

The state machine 348 in communication with the input bus 302 over state machine input path 350 is customized to operate with the 29116 device 300. Some of the instructions executed by the 29116 device 300 are known as immediate instructions. An immediate instruction is one that involves more than one word. For example, if the emulator controller 14 sent an instruction to load a register from the input bus, the next word following the instruction would be the value to be loaded. A unique situation in microprogramming exists in the 29116 device 300 in that an instruction actually gets captured inside the device. Since the emulator 10 is operating and a stopping of the clock externally can happen at any time, it is necessary to keep track of whether or not the device had just executed the first part of an immediate instruction. It is necessary to determine whether the device is waiting for data to be fed in the input bus as opposed to the next instruction being fed in the input bus. The state machine 348 was custom designed to follow the instruction inputs and keep track of whether or not the device was executing an instruction which required a second word. In this way, the state machine determines whether or not the device is half-way through one of the immediate instructions in which case it is necessary to prevent the emulator controller 14 from sending data to change the contents of the 29116 device 300 until the second word of the immediate instruction has been executed. This is done by a signal over test input line 124 to microprogram state controller 54 and emulator controller 14. (See FIGS. 2 and 3). The use of state machine 348 allows the emulator 10 to keep track of instructions on the input bus 302 in a similar manner as is done internally in the 29116 device 300 so that it can be determined when the internal input bus needs to be used for data associated with an immediate instruction.

FIG. 5 illustrates an emulator head 12" which is designed for an AMD 2910 device. Emulator head 12" includes a 2910 device 450 with an input bus 452, an output bus 454, a signal input path 456 and a control signal input path 458. Input bus 452 is the output of an input multiplexer 460 which has two input sources, a target machine input bus 462 and an emulator controller input bus 464. Target machine input bus 462 receives signals from the target machine through a device plug 16". Emulator controller input bus 464 receives signals from the emulator controller 14 via data bus 106 and emulator head data bus 466. Input signals from the target machine may be read by the emulator controller 14 via signal path 468, buffer 470, emulator head data bus 466 and data bus 106.

Clock signal input path 456 is the output of a clock control 472 which has two input sources, a target machine clock signal path 474 and an emulator controller clock signal path 475. Target machine clock signals may be read by the emulator controller 14 through a signal path 476 and clock buffer 477. Clock control 472 functions in a manner similar to that described for the clock multiplexer 320 associated with the 29116 device 300.

The output bus 454 transmits output signals to the target machine over a target machine output signal path 478. Output signals may be read by the emulator controller 14 through emulator controller output bus 479 through output buffer 480. Connection to a trace capability is provided by an input trace connection 482 through an input trace buffer 484 and an output trace connection 486 through an output trace buffer 488.

The 2910 device 450, the structure of which is well known in the art, has an internal stack pointer which keeps track of how many words are on an internal stack. However, external to the 2910 device 450, there is no way to know how many words are on the internal stack. The only indication is a full flag which means a user can only determine when the stack is full. It is desirable in in circuit emulation of a 2910 device to determine the status of the internal stack. This problem is solved by the present invention by microprogramming the microprogram state controller 54 in the emulator controller 14 to push words on the stack until the stack is full. The number of words pushed onto the stack is counted, which, when the size of the stack is known, can be used to determine how many words were on the stack initially. Then, the emulator controller 14 pops all of the words off the stack so that it can read those words. When this is complete, the emulator controller 14 pushes words back on the stack such that the stack is restored to its original condition. These operations all occur or are performed between user clock cycles.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. An emulator for emulating a VLSI device in a target machine, comprising:
   a device plug for insertion in a target machine;
   target machine input/output buffers connected to the device plug by a plurality of signal paths;
   a VLSI device connected to the target machine input/output buffers by a plutality of signals paths;
   a first clock control means connected to the target machine input/output buffers by a signal path and to the VLSI device by a signal path;
   emulator controller with a plurality of input/output buffers connected to the first clock control means by a signal path and to the VISI device by a plurality of signal paths, such that said first clock control means allows either the target machine or a second clock control means to supply the clock signal for the VLSI device;
   a means for determining the nature of instructions sent to the VLSI device by the target machine connected to the target machine input/output buffers by a signal path, to the VISI device by a plurality of signal paths and to the emulator controller with a plurality of input/output buffers by a signal path;
   a plurality of emulator head input/output buffers connected to the emulator controller input/output buffers by a plurality of signal paths;
   a second clock control means connected to the emulator head input/output buffers by a signal path;
   a controller means for controlling the transmission of instructions and control signals to the VLSI device and the reception of data from the VLSI device and the target machine, the control means being connected to the emulator head input/output buffers by a signal path and to the second clock control means by a signal path;
   a means for storing data connected to the current state of the VLSI device connected to the emulator head input/output buffers by a signal path;
   a means for storing new operands;
   a means for selecting the source of signals to be transmitted to the VLSI device, the selector means being connected to the current state data storage means by a signal path, to the controller means by a signal path, to new operands storage means by a signal path and to the emulator head input/output buffers by a plutality of signal paths; and
   a host computer bus connected to the current state data storage means by a signal path, to the new operand storage means by a signal path and to the controller means by a signal path.

2. The emulator of claim 1 wherein,
   the contriller means is a programmed controller means which is programmed for controlling the transmission of instructions and control signals to the VLSI device and the reception of data from the VLSI device and the target machine, the programmed controller means being connected to the emulator head input/output buffers by a signal path and to the second clock control means by a signal path.

3. The emulator of claim 1 wherein,
   said emulator head further includes means for externally simulating a latch internal to said VISI device for receiving input signals from a target machine.

4. The emulator of claim 3 further including,
   a means for detecting a first part of an immediate instruction from the VLSI device and signalling said emulator controller.

5. The emulator of claim 1 further including,
   a means for detecting a first part of an immediate instruction from the VLSI device and signalling said emulator controller.

6. A device for emulating a VLSI device in a target machine comprising:
   an emulator controller including a microprogrammable state controller, which is programmed for controlling the transmission of instructions and control signals to a VLSI device and the reception of data from the VLSI device and the target machine, connected to a multiplexer means, such that a first output of sai microprogrammable state controller is a first input to said multiplexer means a means for storing new operands connected to said multiplexer means such that an output of said means for storing new operands is a second input ot said multiplexer means, a data bus connected to an output of said multiplexer mcans, a data/address bus connected to a second output of the microprogrammable state controller, a means for storing current state data, connected to said data bus and said data/address bus, a means for locating data in the current state data storage means, connected intermediate said microprogrammable state controller and said current state data storage means, which is controlled by the microprogrammable state controller, a means for generating timing signals for the timing of switching circuits in the emulator controller and a means for controlling and varying a clock microcycle type connected to the means for transmitting signals, instructions and data between the emulator controller and the emulator head;

an emulator head including a VLSI device, a means for inputting data and instructions into the VLSI device, a means for bi-directionally inputting and outputting signals from the VLSI device, a means for controlling clock signals to the VLSI device such that either the target machine or the means for controlling and varying a clock microcycle type supplies the clock signals, a means for connecting the input means to a trace device, a means for connecting the bi-directional input and output means to a trace device, and a means for inputting control signals into the VLSI device;

a means for transmitting signals, instructions and data between the emulator controller and the emulator head; and a means for connecting the emulator head to a target machine such that the VLSI device in the target machine is effectively replaced by the emulator head.

7. The device of claim 6, wherein said microprogrammable state controller comprises an instruction register receiving data from a host processor bus and providing data to a 2910 sequencer for sequencing of instructions out of a microprogram memory to a pipeline register, said pipe line register having a plurality of outputs including a combination data/address bus, a pointer control output, a multiplexer control output and a state controller data output, and a multiplexer for selecting between a test signal and a start instruction execution signal for input into said 2910 sequencer.

8. The device of claim 6, wherein, said emulator head further includes means for externally simulating a latch internal to said VLSI device for receiving input signals from a target machine.

9. The device of claim 8, wherein said emulator head further includes a means for detecting a first part of an immediate instruction and signalling said emulator controller.

10. The device of claim 6, wherein, said emulator head includes a means for inputting data and instructions selectively from a target machine, or the emulator controller into the VISI device and making data and instructions provided by the target machine available to the emulator controller, a means for controller clock signals to the VLSI device, a means for providing the output of the VISI device to the target machine and the emulator controller, a means for inputting control signals into the VLSI device, and means for connecting 2910 device output data and input data and instructions provided by the target machine to a trace device.

11. The device of claim 10, wherein said emulator controller further includes a means for determining the contents of an internal stack within said 2910 device.

12. The device of claim 10, wherein said emulator head further includes a means for determining the contents of an internal stack within said 2910 device.

13. The device of claim 6, wherein said means for transmitting signal instructions and data between the emulator controller and the emulator head includes a multilead cable.

14. The device of claim 6, wherein said means for connecting the emulator head to a target machine comprises a multipinned plug connected to said emulator head by a multilead cable of minimum length.

15. The device of claim 6, wherein said VLSI device is of a non-fixed instruction set type.

16. The device of claim 16, wherein said emulator controller is connected to and controls more than one emulator head.

* * * * *